United States Patent [19]
Fletcher

[11] Patent Number: 4,891,251
[45] Date of Patent: Jan. 2, 1990

[54] FLORAL CENTERPIECE CONSTRUCTION

[76] Inventor: Maria L. Fletcher, P.O. Box 934, Roseburg, Oreg. 97470-0218

[21] Appl. No.: 308,641

[22] Filed: Feb. 10, 1989

[51] Int. Cl.⁴ .......................... B32B 5/08; B44C 3/02
[52] U.S. Cl. ......................................... 428/7; 156/63; 248/27.8; 428/10; 428/17; 428/27
[58] Field of Search .................... 428/7, 10, 17, 27; 493/957, 958; 248/27.8; 156/63

[56] References Cited

U.S. PATENT DOCUMENTS

| | | | |
|---|---|---|---|
| 2,366,183 | 1/1945 | Dahlman | 428/131 |
| 3,141,808 | 7/1964 | Wellens | 428/10 X |
| 4,293,602 | 10/1981 | Coffey et al. | 428/28 |
| 4,435,452 | 3/1984 | Hernandez et al. | 428/17 |
| 4,445,950 | 5/1984 | Browning | 156/63 |
| 4,525,393 | 6/1985 | DiCostanzo | 428/10 X |
| 4,544,585 | 10/1985 | Brenner | 428/17 |
| 4,606,950 | 8/1986 | Corbet | 156/63 X |
| 4,612,218 | 9/1986 | Enterline | 248/27.8 X |
| 4,664,956 | 5/1987 | Dokkestul et al. | 428/22 |

FOREIGN PATENT DOCUMENTS 735988 8/1955 United Kingdom ................. 428/10

Primary Examiner—Henry F. Epstein
Attorney, Agent, or Firm—James D. Givnan, Jr.

[57] ABSTRACT

The centerpiece includes first and second quantities of moss one each located above and below a strip of lace and attached thereto by a matrix. The strip of lace is provided a desired shape by a shaped wire element woven into the inner margin of the strip. The matrix is shown as a clear thermoplastic glue in which the moss is partially embedded. A method of construction is also disclosed.

6 Claims, 1 Drawing Sheet

FLORAL CENTERPIECE CONSTRUCTION

BACKGROUND OF THE INVENTION

The present invention pertains generally to decorative floral items for display in the home.

The use of moss in a centerpiece or like floral display is hampered by the stringy nature of same. The use of moss in manufactured centerpieces which require shipment to the end user is limited in that the moss does not withstand packaging and shipping well.

U.S. Pat. No. 4,544,585 shows the use of a banner shaped sheet to which an adhesive is first applied followed by the deposit of large and small fragments of moss to provide a strip or banner of mossy appearance for use in window dressing efforts and in floral displays to conceal holders, foam plastic blocks and the like.

U.S. Pat. No. 4,525,393 is of interest in that a gift of a decorative nature is shown having a skirt of decorative cloth held in place by concentric frames.

U.S. Pat. No. 3,141,808 shows an "advent" wreath having a circular base to which foliage is clipped or stapled.

SUMMARY OF THE PRESENT INVENTION

The present invention is embodied in a decorative centerpiece which utilizes a matrix in which moss is partially embedded with the matrix supplemented by a stiffener element.

The stiffener element of the centerpiece serves to receive a decorative perforate strip of fabric such as lace through which the molten matrix material may pass to penetrate that portion of the moss below said strip. The bodies of moss, below and above the strip, are accordingly joined with the strip and with the stiffener. A suitable matrix is is clear thermoplastic glue which, when in place, is translucent and takes on the color of the embedded moss so as to be unnoticeable.

Important objectives of the present invention include the provision of a centerpiece which permits the use of moss by effecting the partial embedment of virtually all the moss tendrils in a thermoplastic body to aid in preserving same and to hold the moss intact during packaging and shipping; the provision of a centerpiece wherein a stiffener element and a perforate strip of material or cloth, such as lace, is joined with shaped bodies of moss by a quantity of an injected matrix.

DETAILED DESCRIPTION OF THE PREFERRED EMBODIMENTS

Figure 1:
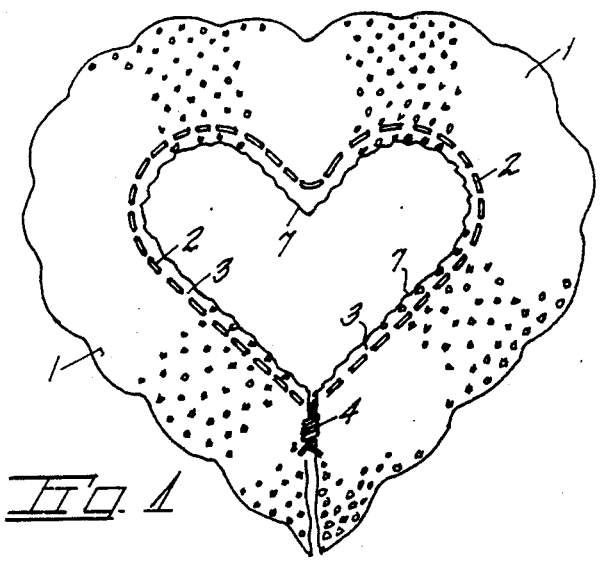
FIGS. 1, 2 and 3 are plan views of the partially completed centerpiece.
Figure 2:
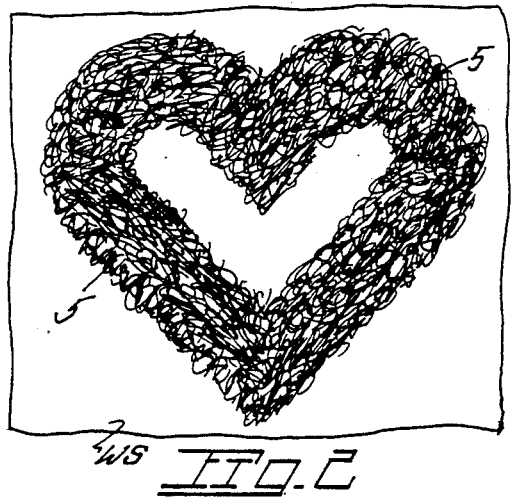

With continuing attention to the drawings wherein applied reference numerals indicate parts similarly hereinafter identified, the reference numeral 1 indicates a strip of perforate cloth material such as lace.

A perforate strip 1 is held in a desired shape such as the heart shown by a stiffener element 2 shown as a wire inserted or threaded along an inner margin 3 of the strip. While shown as being threaded through the strip margin, it is to be understood stiffener wire element 2 could be inserted through a strip inner margin folded back and stitched to itself to make a tunnel. Stiffener element 2 and the material strip may be held in closed configuration such as by twisting at 4 of the ends of the stiffener element.

A first quantity of moss at 5 is manually shaped on a work surface WS so as to correspond generally to the shape of strip 1.

Figure 3:
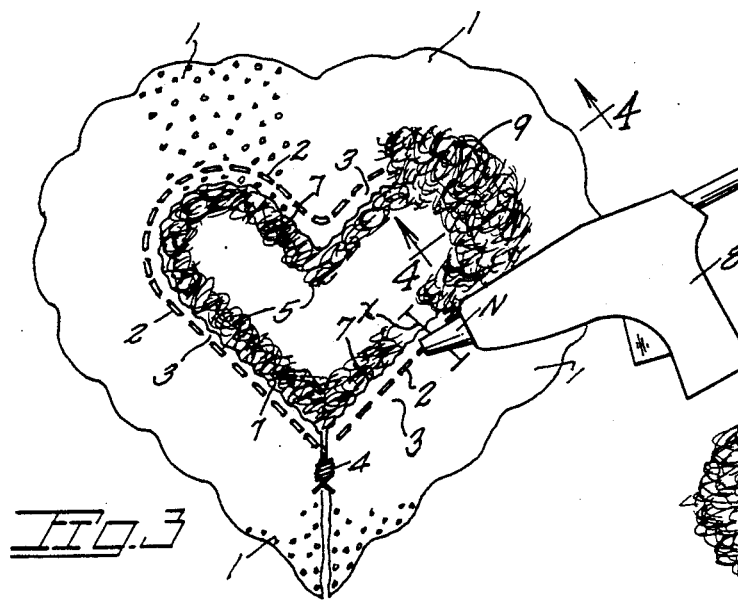
Figure 4:
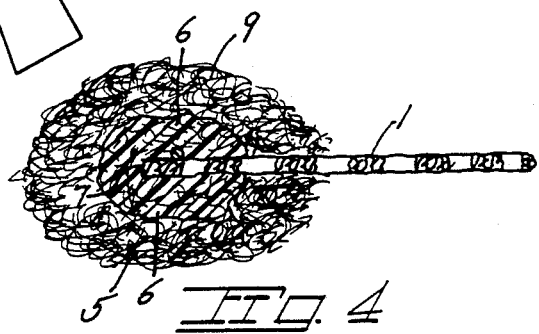
FIG. 4 is a sectional view taken along line 4—4 of FIG. 3.

As shown in FIG. 3, strip 1 with stiffener element 2 is superimposed on the quantity of moss 5 subsequent to which matrix material 6 is applied along inner margin 3 of the strip. One suitable matrix is thermoplastic glue of the translucent or clear type. A mass of matrix material 6 is disposed along the inner margin 3 of the strip of perforate material and somewhat inwardly as shown at X in FIG. 3. The matrix material gravitates through the openings in perforate material which results in a quantity or portions of matrix above and below strip inner margin 3.

An additional quantity of moss at 9 is then manually embedded in the mass of matrix material 6 by depositing same thereon per FIG. 3 and to some extent, inwardly from the strip inner extremity at 7. A suitable matrix material is glue administered by a "glue gun" 8 having a heating component and a nozzle N which allows the heated molten glue to be injected into the body of moss. A more or less uniform quantity of moss is accordingly provided about the inner margin 3.

Figure 5:
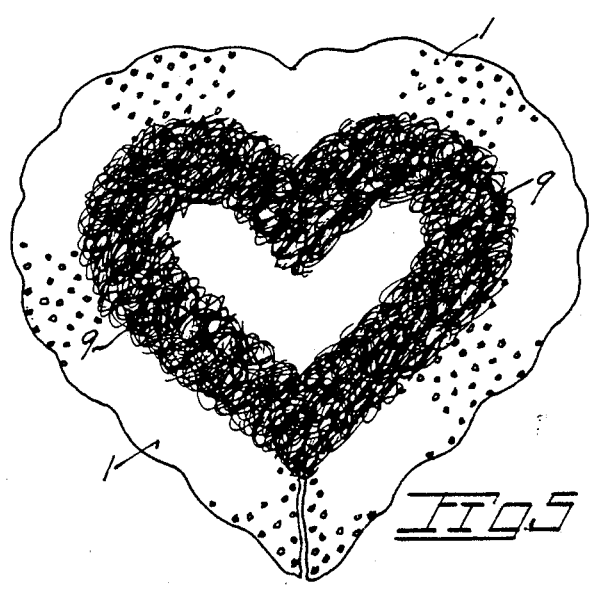
FIG. 5 is a plan view of a completed centerpiece.

The centerpiece, as shown in FIG. 5, has an open center area 10 in which may be placed a bouquet 11 or other decorative article.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A decorative centerpiece comprising in combination,
    a mass of matrix material in the general shape of the centerpiece,
    a stiffener element embedded in said mass,
    a strip of material having a first margin at least partially embedded in said matrix material and an unencumbered margin disposed outwardly from said material,
    said mass of matrix material having portions above and below said strip, and
    moss partially embedded in said matrix material and concealing same material.

2. The centerpiece claimed in claim 1 wherein said mass of matrix material and said stiffener element are of closed configuration.

3. The centerpiece claimed in claim 1 wherein said strip of material is lace, said matrix material occupying open areas in the lace.

4. The centerpiece claimed in claim 3 wherein the stiffener element is a length of wire in inserted engagement with the lace.

5. The method of constructing a centerpiece consisting in the steps of,
    attaching a segment of decorative wire to a strip of material,
    shaping the wire segment and strip of material,
    arranging a first quantity of moss in a shape corresponding to the shape of the segment of wire, superimposing the wire segment and attached material on said quantity of moss,
depositing a mass of matrix material on a margin of said strip of material,
depositing a second quantity of moss on said matrix material and biasing same into the mass of matrix material so as to embed a portion of the moss in same.

6. The centerpiece claimed in claim 1 wherein said mass of matrix material is translucent thermoplastic glue.

* * * * *